United States Patent
Salenbauch et al.

Patent Number: 6,070,844
Date of Patent: Jun. 6, 2000

[54] VARIABLE SIZE VEHICLE BEVERAGE CONTAINER HOLDER

[75] Inventors: Hermann Juergen Salenbauch, Geretsried; Alexander Klatt, Munich, both of Germany; Robert Stancel, Los Altos Hills; Johnathan I. Kaplan, Palo Alto, both of Calif.; Alex Kazaks, La Crosse, Wis.; Bruce Grant MacGregor; Steven Vassallo, both of Palo Alto, Calif.

[73] Assignee: Bayerische Motoren Werke Aktiengesellschaft, Munich, Germany

[21] Appl. No.: 09/160,753

[22] Filed: Sep. 25, 1998

[51] Int. Cl.[7] .............................. A47K 1/08; A47F 5/00; A47G 1/10
[52] U.S. Cl. ...................... 248/313; 248/311.2; 248/314; 248/316.3
[58] Field of Search ................................. 248/311.2, 313, 248/314, 316.2, 316.1, 316.3, 310, 526, 550; 224/926, 567

[56] References Cited

U.S. PATENT DOCUMENTS

| | | | |
|---|---|---|---|
| 5,054,733 | 10/1991 | Shields | 248/313 |
| 5,071,096 | 12/1991 | Hartman et al. | 248/154 |
| 5,087,008 | 2/1992 | Miller et al. | 248/311.2 |
| 5,143,338 | 9/1992 | Eberlin | 248/313 |
| 5,560,578 | 10/1996 | Schenken et al. | 248/313 |
| 5,601,269 | 2/1997 | Jankovic | 248/311.2 |
| 5,791,618 | 8/1998 | Lancaster | 248/311.2 |
| 5,839,711 | 11/1998 | Bieck et al. | 248/313 |

FOREIGN PATENT DOCUMENTS

| | | |
|---|---|---|
| PS3933017 | 7/1924 | Germany . |
| 2302891 | 7/1974 | Germany . |
| 19744919A1 | 5/1998 | Germany . |

*Primary Examiner*—Ramon O. Ramirez
*Assistant Examiner*—David Heisey
*Attorney, Agent, or Firm*—Evenson, McKeown, Edwards & Lenahan, P.L.L.C.

[57] ABSTRACT

A beverage holder composed of hollow cylindrical upper and lower parts, where the parts are rotatable with respect to one another. The upper and lower parts are connected with one another by a plurality of rod-shaped connecting elements (rods). When the two parts are rotated relative to one another, the rods are tilted, such that the inside diameter inside the hollow cylindrical upper and lower parts is reduced. In this manner, a container inserted into the beverage holder is reliably clamped. The rod-shaped connecting elements may be designed "in the manner of a stocking." When an impermeable material is used and the rod-shaped connecting elements are attached in a sealing fashion to the hollow cylindrical assembly and/or the ring, the cylindrical assembly then becomes suitable for allowing a liquid or a gaseous media to flow through it.

19 Claims, 2 Drawing Sheets

VARIABLE SIZE VEHICLE BEVERAGE CONTAINER HOLDER

BACKGROUND AND SUMMARY OF THE INVENTION

The invention relates to a hollow cylindrical assembly which is divided into two mutually rotatable sections that are connected with one another by an insert located inside the hollow cylindrical assembly. The insert is deformed or displaced during rotation of sections such that the inside diameter of the cylindrical assembly is reduced.

A beverage holder is in the form of hollow cylindrical upper and lower parts that are rotatable with respect to one another. The two sections are connected with one another by a plurality of rod-shaped connecting elements. When the two sections are rotated relative to one another, the rods are tilted, so that the inside diameter of the inside sections is reduced. In this manner, a beverage container inserted into the hollow cylindrical assembly is reliably clamped.

An object of the invention is to provide a universally applicable, easily assembled device with which the inside cross section of the hollow cylindrical assembly can be changed.

This and other objects and advantages are achieved by the hollow cylindrical assembly, according to the invention, in which a portion of the hollow cylindrical assembly, or a portion of a ring which is inserted into the interior of the hollow cylindrical assembly, is turned (relative to the fixed (portion of) the part(s)) in order to turn an internal insert. The internal insert is thereby narrowed, which in turn narrows the inside diameter of the hollow cylindrical assembly.

In an embodiment according to the invention, the insert is designed "in the manner of a stocking," and has a flexible wall (preferably made of an elastic material, for example). When an impermeable material is used and the insert is attached in a sealing fashion to the hollow cylindrical assembly and/or the ring, the cylindrical assembly is suitable for allowing a liquid or a gaseous media to flow through it.

Various embodiments of the present invention are contemplated. Of course, an artisan would recognize that the insert need not be a one piece and circumferential insert, but can also be formed by one or more partial surfaces of a hollow cylinder (for example, by two such surfaces located opposite one another).

In certain preferred embodiments of the invention, a plurality of connecting elements are used. Here, each connecting element has the shape of a rod, flat rod, strip, etc. This creates an internal structure which is admittedly not liquid- or gas-tight, but during turning, reduces the inside diameter of the part for holding solid objects. Thus, objects can be retained inside the hollow cylinder by clamping them in place. This version of the invention can be used in an advantageous manner for a beverage holder.

The connecting elements in certain embodiments can be made elastic or dimensionally rigid. In the case of elastic connecting elements, the changes in shape and length produced by turning the sections of the part and/or the ring are caused by the material itself. With dimensionally stable connecting elements, an articulated connection as well as an equalization of length are also required. By using dimensionally rigid connecting elements, higher clamping forces may be achieved than in the case where elastic connecting elements are used.

In preferred embodiments of the invention, an adjusting unit that generates outside force is provided. As a result of actuation by a motor, an increase in operating comfort is achieved (in a beverage holder, for example). On the other hand, the actuator allows remote operation or automated operation. As a result, in the case of a tube with a liquid (for example) flowing through it, depending on various parameters, automatic changes in the throughput cross section can be made by a control or regulating unit.

In preferred embodiments according to the invention, a beverage holder provides a clamping effect which is independent of the diameter of the beverage container. In known beverage holders, the beverage container is placed in a hollow cylinder, on whose internal circumference devices are provided that produce a form fitting connection (by spring force, for example). As a result, a clamping force that depends on the diameter of the beverage container is created which secures the beverage container more or less securely. On the other hand, the beverage holder according to the invention is characterized by a clamping effect that is independent of the diameter and is reliable. Since the clamping force is not applied until after the beverage container has been inserted, no radially acting forces need be overcome during the adjustment of the beverage container. In addition, the removal of the container is especially comfortable in nature following the return of the clamping insert to its initial position. The twisting of the two sections of the beverage container with respect to one another and/or the rotation of the ring can be accomplished by muscular force or by outside energy. Locking in the clamped position is effected, for example, by a latching pawl mechanism or by self-locking.

In preferred embodiments of the present invention, a bottom part is provided whose loading automatically causes the insert to rotate. Conversely, relieving the load on the bottom part during the initial phase of the removal of the inserted beverage container causes the insert to return to its initial position. While considerable clamping forces must sometimes be overcome in known beverage holders during the insertion and during the removal of the beverage container, the beverage holder according to the invention possesses an especially high degree of operating comfort because of the automatic locking or release of the beverage container. In addition, a positive surprising effect is created in the user who automatically and properly operates the beverage holder "without being told how to use it" because of the automatic clamping action.

In preferred embodiments of the invention, to achieve sufficiently high and constant clamping forces, a device is provided which automatically deactivates the actuator when a predetermined torque is exceeded. As a result, a sufficient clamping force is applied regardless of the diameter of the inserted beverage container.

In preferred embodiments according to the invention, the actuator can be deactivated as a function of travel when a certain rotational angle is exceeded.

In certain preferred embodiments of the present invention, the rotation angle is limited via the current draw of an actuator constituted by an electric motor. As a result, the actuator is deactivated when a maximum value of the current draw is exceeded that is associated with a certain torque.

As previously mentioned, in an insert with closed walls, the hollow cylindrical assembly according to the invention is especially suited for a gaseous or liquid flow medium which provides the advantage of low throttle losses. As a result, for example, the throughput through a pipe, a heating or ventilating system, or an air conditioner of a vehicle can be regulated. Another area of application is changing the cross section of an intake line of an internal combustion engine for example.

Other objects, advantages and novel features of the present invention will become apparent from the following detailed description of the invention when considered in conjunction with the accompanying drawings.

DETAILED DESCRIPTION OF THE DRAWINGS

Figure 1:
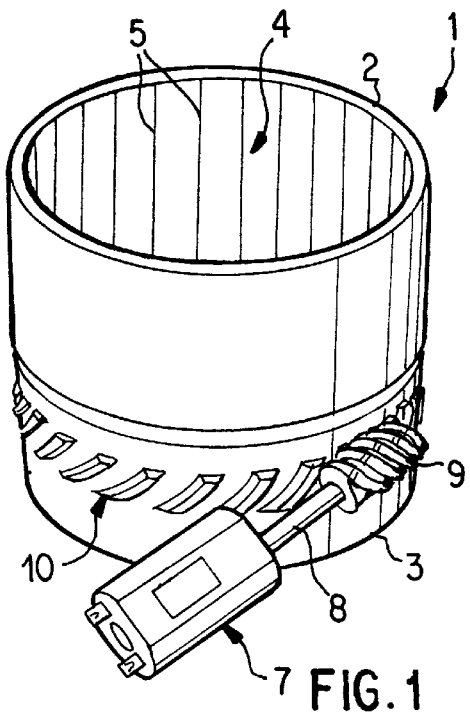
FIG. 1 is a perspective view of a beverage holder, with an electric motor actuator construed according to preferred embodiments of the present invention.
Figure 2:
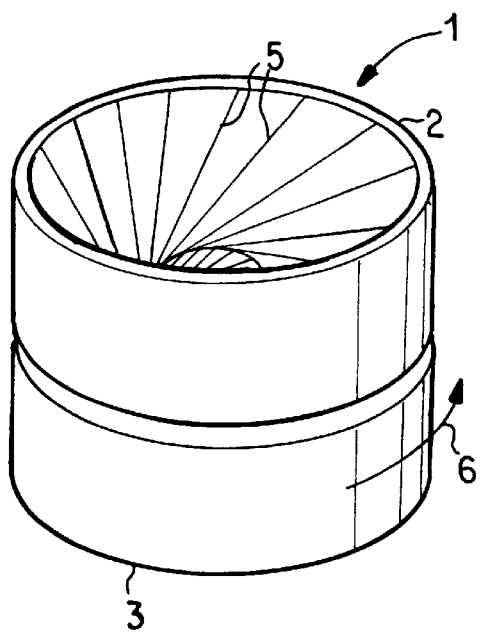
FIG. 2 is a view of the beverage holder in FIG. 1 following rotation, without showing the actuator.

FIGS. 1 and 2 show a beverage holder according to the invention which essentially consists of a hollow cylinder 1 that is divided into an upper part 2 and a lower part 3. Inside hollow cylinder 1 is an insert 4 made of a plurality of rods 5, which are secured at their upper ends (at upper section 2) and at their lower ends (at lower section 3). Rods 5 in the present embodiment are distributed equidistantly and describe a cylindrical jacket surface, whereby (of course) a nonuniform distribution of rods 5 is also possible.

The beverage holder is depressed in a center console of a motor vehicle, for example. While upper section 2 is secured to the center console, the lower section 3 is rotatable relative to the upper section 2, as indicated by arrow 6 (see FIG. 2). The rotation is produced by an electric motor actuator 7, which drives a worm thread 10 on the outer circumference of lower section 3 through a drive shaft 8 with an endwise worm 9. Worm thread 10 forms a worm gear which is designed to be self-locking in connection with worm 9.

Figure 3:
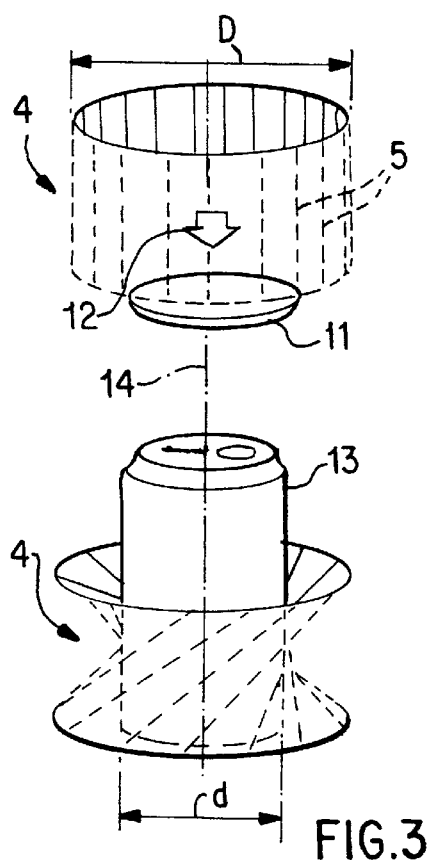
FIG. 3 is a schematic diagram of the operation of the beverage holder according to the invention.

To illustrate the operation of the beverage holder according to the invention, FIG. 3 does not show hollow cylinder 1, so that an insert 4 with its rods 4 is visible, with those rods 5 that are covered by hollow cylinder 1 in FIGS. 1 and 2 (indicated by dashed lines).

Insert 4 in the initial state (top picture in FIG. 3) has an inside diameter D. With a load (arrow 12) on a bottom part 11 at the lower end of hollow cylinder 1 produced by an inserted beverage container in the form of a beverage can 13, actuator 7 is energized so that it causes rotation of lower section 3. As a result, rods 5 are brought into the inclined position shown in the bottom part of FIG. 3 in which they reliably clamp beverage container 13. In this position, rods 5 describe a one-sheet hyperboloid with a reduced inside diameter d. Rods 5 are mounted such that they are spherically movable at their ends relative to sections 2 or 3 and additionally are not fixed at one of sections 2 and 3 in the direction of their lengthwise extent (length compensation). When the load on bottom part 11 is relieved, actuator 7 is reversed. As a result, insert 4 is turned back into its initial position and beverage container 13 is released.

Figure 4:
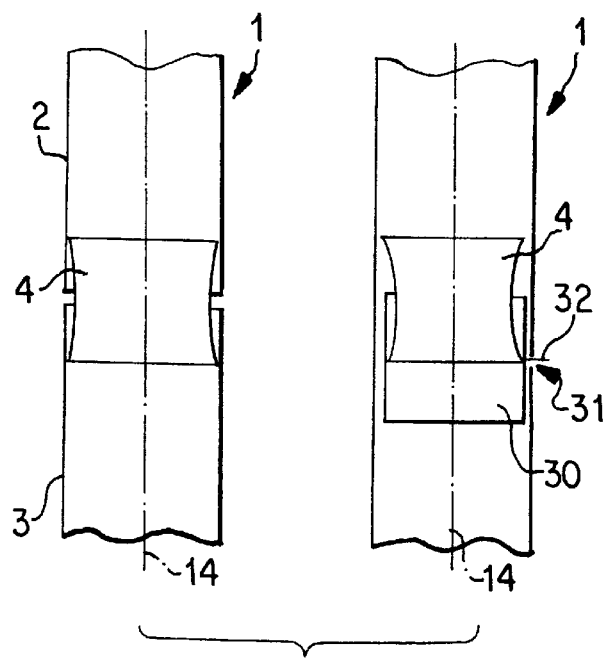
FIG. 4 shows schematic sections of tubes for liquid or gaseous media with an insert for reducing the cross section.

In FIG. 4, for example, two possible embodiments of the invention are illustrated with reference to a pipe 1 carrying liquid or gas. On the left side of the picture, pipe 1 (similar to the design of the beverage holder according to FIGS. 1 to 3) is divided into two sections 2 and 3 that are rotatable with respect to one another. The sections are connected with one another in a sealing fashion by an insert 4 in the form of a closed-wall tubular structure. According to the picture on the right-hand side of FIG. 4, pipe 1 is a continuous undivided hollow cylinder with an internal concentric ring 30 that has a smaller diameter. The ring 30 is capable of being rotated through a slot-shaped opening 31 in pipe 1 via a pin 32 which project to the outside. As before, insert 4 consists of a closed-wall tubular structure.

Figure 5:
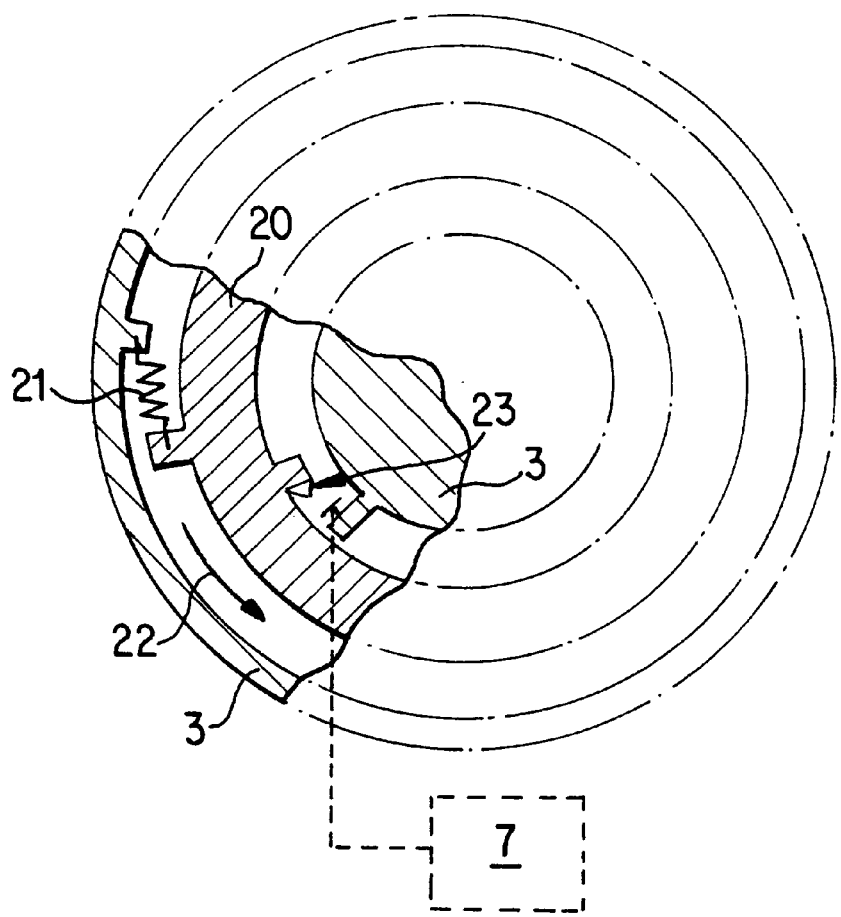
FIG. 5 shows a device for shutting off the actuator for the beverage holder in FIG. 1, in a partial section.
Figure 6:
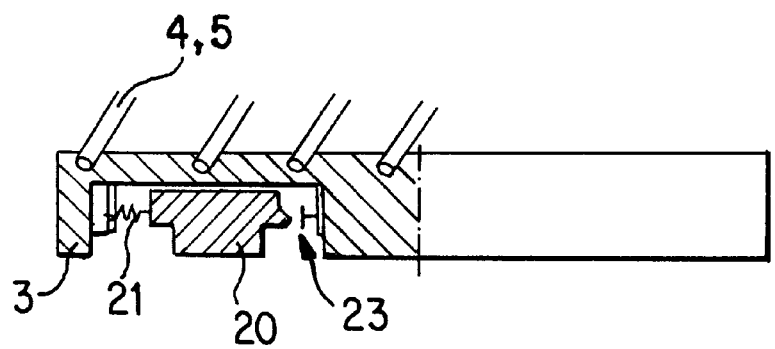
FIG. 6 is a partial vertical section in the vicinity of the device in FIG. 5.

In FIGS. 5 and 6, a device is shown for deactivating actuator 7 when a predetermined clamping force is exceeded. Such a device can be used, for example, for a beverage holder according to FIGS. 1 thru 3. In contrast to the view in FIG. 1, the driving of lower section 3 via actuator 7 is indirect (i.e., a switching ring 20 instead). In the initial phase of clamping an inserted beverage container 13, the switching ring 20 (driven by actuator 7) twists the lowest section 3 and hence rods 5 of insert 4 via a spring 21. After rods 5 have applied themselves to beverage container 13, actuator 7 can increase the clamping force until the clamping force overcomes the spring force of spring 21, whereupon switching ring 20 twists in the direction of arrow 22 and actuates a switch contact 23 that deactivates actuator 7. By means of a mechanical lock (for example, a latching pawl of an actuator 7 that is designed to be self-locking), the clamping force is maintained after actuator 7 is deactivated.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A variable diameter beverage container holder for holding beverage containers in a vehicle, comprising:

first and second axially aligned tubular members which are axially spaced from one another, a plurality of connecting rod members which each have a first end connected with the first tubular member and a second end connected with the second tubular member, said connecting rod members being disposed adjacent one another to form a hollow space bounded by the connecting rod members and extending between and coaxially with respect to the first and second tubular members, and a rotating mechanism operable to rotate the first and second tubular members with respect to one another with consequent tilting of the rod members thereby varying a beverage container accommodating opening of the hollow space formed by the rod members.

2. A beverage container holder according to claim 1, comprising a container supporting bottom part disposed under the hollow space when said holder is in an in use container supporting position.

3. A beverage container holder according to claim 2, wherein said tubular members are cylindrical members.

4. A beverage container holder according to claim 2, wherein the bottom part operatively cooperates with a switching device, and based on a weight applied to the bottom part, the switching device actuates an actuator of the mechanism to rotate the first and second tubular members.

5. A beverage container holder according to claim 4, comprising a deactivation device to deactivate the actuator when a predetermined torque acting on the first and second tubular members is exceeded.

6. A beverage container holder according to claim 1, wherein said tubular members are cylindrical members.

7. A beverage container holder according to claim 1, wherein the rotating mechanism comprises:

an electric motor, and a worm drive connecting the electric motor with one of the tubular members.

8. A beverage container holder according to claim 7, comprising a container supporting bottom part disposed under the hollow space when said holder is in an in use container supporting position.

9. A beverage container holder according to claim 1, wherein the rotating mechanism comprises:

an electric motor operable to rotatably move a ring member, a spring connecting the ring member with one of the tubular members, and a deactivation switch operable in response to predetermined loads on the spring to deactivate the motor and thereby limit beverage container clamping forces of the rod members.

10. A beverage container holder according to claim 9, comprising a container supporting bottom part disposed under the hollow space when said holder is in an in use container supporting position.

11. A beverage container holder according to claim 1, wherein the connecting rod members are dimensionally rigid members which are pivotably connected to the respective tubular members, and wherein the tubular members are axially movably with respect to one another during relative rotation of the tubular members.

12. A beverage container holder according to claim 11, wherein the rotating mechanism comprises:

an electric motor operable to rotatably move a ring member, a spring connecting the ring member with one of the tubular members, and a deactivation switch operable in response to predetermined loads on the spring to deactivate the motor and thereby limit beverage container clamping forces of the rod members.

13. A beverage container holder according to claim 11, comprising a container supporting bottom part disposed under the hollow space when said holder is in an in use container supporting position.

14. A beverage container holder according to claim 1, wherein the connecting rod members are elastically deformable members.

15. A beverage container holder according to claim 1, wherein said first tubular member is fixed in position at a vehicle console when in an operable in use position, and wherein said second tubular member is disposed in use below and rotatable with respect to the first tubular member.

16. A beverage container according to claim 15, comprising a container supporting bottom part disposed under the hollow space when said holder is in an in use container supporting position.

17. A beverage container according to claim 16, wherein the bottom part operatively cooperates with a switching device, and based on a weight applied to the bottom part, the switching device actuates an actuator of the mechanism to rotate the second tubular member.

18. A beverage container according to claim 16, wherein the rotating mechanism comprises:

an electric motor, and a worm drive connecting the electric motor with the second tubular member.

19. A beverage container according to claim 16, wherein the rotating mechanism comprises:

an electric motor operable to rotatably move a ring member, a spring connecting the ring member with the second tubular member, and a deactivation switch operable in response to a predetermined load on the spring to deactivate the motor and thereby limit beverage container clamping forces on the rod members.

* * * * *